United States Statutory Invention Registration [19]

[11] Reg. Number: H564

Allen, III et al. [43] Published: Jan. 3, 1989

[54] PIGMENT MILLING PROCESS

[75] Inventors: Arthur H. Allen, III, Charlotte, N.C.; Arthur R. Heuser, Rock Hill, S.C.; Richard J. Meyer, Rock Hill, S.C.; Judy B. Payne, Clover, S.C.

[73] Assignee: BASF Corporation, Clifton, N.J.

[21] Appl. No.: 856,268

[22] Filed: Apr. 28, 1986

[51] Int. Cl.[4] ..... C09B 48/00
[52] U.S. Cl. ..... 106/497
[58] Field of Search ..... 106/309

[56] References Cited

U.S. PATENT DOCUMENTS 4,427,810 1/1984 Chisvette et al. ..... 106/20
4,478,968 10/1984 Jaffe ..... 106/309
4,541,872 9/1985 Jaffe ..... 106/309

FOREIGN PATENT DOCUMENTS 2051108 1/1981 United Kingdom .

*Primary Examiner*—John F. Terapane
*Assistant Examiner*—Susan Wolffe
*Attorney, Agent, or Firm*—Michael R. Chipaloski

[57] ABSTRACT

Aqueous pigment concentrates are produced by a two-step milling process. The process comprises a. pumping a crude with from about 12% to about 48% by weight of surfactant, based on pigment, and an amount of water sufficient to reduce the crude concentration to 10 to 50% by weight, based on the total mixture, and b. continuously pumping the blend of (a) through at least two shot mills in series containing between 50 and 90% by volume of a grinding media that has a size in the range of 0.1 to 1.5 mm diameter and then grinding until the particle size has been reduced to where the pigment dispersion has suitable tinctorial strength for use in inks and coatings.

3 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PIGMENT MILLING PROCESS

The present invention relates to a novel pigment milling process. Aqueous pigment concentrates are produced by a two-step milling process.

BACKGROUND OF THE INVENTION

1. Field of the Invention

This invention relates to a continuous process for the manufacture of pigment dispersions and more particularly to a continuous process for the production of pigment in an aqueous dispersion. The pigment dispersion may be used directly in water-based printing inks and coatings and may be used directly in oil-based inks where the associated water can be tolerated. The dispersion may also be used in oil-based printing inks by flushing the aqueous pigment into a water-immiscible printing ink vehicle.

2. Description of the Prior Art

The manufacture of most pigments usually results in the formation of a product of relatively large crystal size or one contianing impurities and has been referred to in the art as crude. This crude required some form of particle size reduction and/or purification to be useful as a pigment having the tinctorial strength and intensity necessary for use in compositions such as inks, paints, etc.

Various methods have been proposed by the prior art to reduce the particle size and improve the purity of the crude.

One such method relates to the milling of the phthalo crude in an organic liquid as exemplified in U.S. Pat. Nos. 2,556,726; 2,556,727; 2,556,728; and 2,908,690.

The use of an aqueous medium for milling crude is known and is disclosed in U.S. Pat. No. 2,999,862. This patent, however, relates to the use of water as the exclusive grinding assistant and results in a flocculated purified product. U.S. Pat. No. 3,775,149 relates to the preparation of pigments and is specifically concerned with the milling of phthalo crude in aqueous suspension, in the presence of a surfactant, to give a filterable paste of phthalocyanine which is predominantly of the beta-pigment form. This method, however, also results in flocculated product where the pigment is purified when recovered as a presscake or in dry form. Thus, flocculation of the pigment has been a desirable feature according to these prior art processes and has provided a means for purifying the pigment. However, the resultant presscake or dry form of the pigment must then be redispersed for use in products such as inks, paints, etc. We have now found that pigment can be produced by a continuous method in aqueous suspension form that can then be used directly in water-based products such as inks and can be directly used in oil-based products where small amounts of water can be tolerated or flushed into oil-based products such as oil-based inks. This aqueous pigment dispersion according to the invention thus eliminates two steps in the use of pigment, i.e., filtering the flocculated pigment and redispersion for an end use.

SUMMARY OF THE INVENTION

The present invention relates to a two-step continuous method of converting crude pigment to a dispersed form which is useful in inks and coatings, said method comprising a (A) premixing a crude with from about 12 to about 48% by weight of surfactant, based on pigment, and an amount of water sufficient to reduce the crude concentration to 10 to 50% by weight, based on the total mixture, and (B) continuously pumping the blend of (a) through at least two shot mills in series containing between 50 and 90% by volume of a grinding media that has a size in the range of from about 0.1 to 1.5 mm. diameter and then grinding until the particle size has been reduced to where the pigment dispersion has suitable tinctorial strength for use in inks and coatings.

DETAILED DESCRIPTION OF THE INVENTION

The present invention provides a continuous method of producing aqueous pigment dispersions. The method comprises (A) premixing crude with from about 12 to 48% by weight of surfactant based on pigment and an amount of water sufficient to reduce the crude concentration to 10 to 50% by weight, based on the total mixture.

(B) continuously pumping the blend of (a) through at least two shot mills in series containing between 50 and 90% by volume of a grinding media that has a size of from about 0.1 to 1.5 mm. diameter and then ginding until the particle size has been reduced to pigment particle size.

By crude we mean all crude pigment obtained commercially by various well known syntheses. Typical pigments obtained by the present method include red pigments of the quinacridone type, green pigments of the pthalocyanine type, and violet pigments of the carbizol and quinacridone type. The crude typically has a particle size wherein at least 80% of the crude particles have a size greater than 1 micrometer. After conversion of the crude according to the method of this invention, it has been found that at least 95% of the pigment particles have a size less than 1 micrometer, and this size is referred to herein as pigment particle size. The particle size measurements are conveniently made by using a Sedigraph 500 Particle Size Analyzer. By pigment particle size we mean that the particle size of the crude has been reduced to where the dispersion of pigment has the tinctorial strength suitable for use in inks and coatings.

Tinctorial stength is conveniently measured by comparing the color of one pigment (the batch), mixed with a specified amount of white base, with the color of another pigment (the standard) mixed with an equal amount of the same white base. The amounts of standard and batch pigments are the same in the two tints, but they will appear to be different if there is a difference in strength. If the color of the batch tint appears to have been produced by a larger amount of pigment than the color of the standard tint, the batch is considered to be stronger than the standard. Utilizing such procedures, it has been found that the tinctorial strength of the crude is very small or essentially zero whereas that of the pigment dispersion according to this invention is much stronger (on the order of 100 times) than that of the crude.

In a preferred embodiment, the present invention relates to a method of converting a crude having at least 80% of the particle sizes of greater than 1 micrometer to a disperse form which is useful in inks and coatings, said method comprising (A) premixing crude pigment, with 12 to 48% by weight of surfactant and an amount of water sufficient to reduce the pigment concentration to 10 to 50% by weight, based on total mixture, and (B) continuously pumping the blend of (a) through at least two shot mills in series containing between 50 and 90% by volume of a grinding media that has a particle size in the range of 0.1 to 1.5 mm. diameter, and then grinding until the dispersion has suitable tinctorial strength for use in inks and coatings.

The surfactants useful include water-soluble, non-ionic, cationic, and anionic types. However, only certain compounds in each class will be effective dispersants. In order to be effective a surfactant according to this invention must meet the following criteria:

(A) The concentration of the surfactant relative to the crude pigment must be such that the total surface of the crude is covered in a monomolecular layer of surfactant in the dispersed stage, and (B) The surfactant must be water-soluble or dispersible up to the required concentration level.

The non-ionic surfactants can generally be described as ethylene oxide adducts and can be represented by the following formulas:

$$R{-}O\,(CH_2CH_2O)_n{-}H$$

wherein n=3 to 70, R is selected from (1) an alkyl group containing 10–22 carbon atoms, or (2) an alkyl phenol group containing 8–18 carbon atoms.

II.

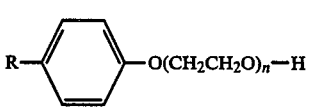

wherein n=3 to 70 and R is an alkyl group containing 8 to 18 carbon atoms.

III.

$$R{=}R\ \overset{O}{C}{=}O(CH_2CH_2O)_n{-}H$$

R is an alkyl group containing 12 to 22 carbon atoms.

Useful cationic surfactants are quaternary ammonium salts and specific amines and can be represented by the following formulas:

| | |
|---|---|
| I. 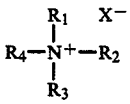 | Quaternary Cationics<br>$R_2$, $R_3$ and $R_4$ are alkyl groups containing from 1 to 12 carbon atoms, $R_1$ is an alkyl group containing 8–22 carbon atoms, X = $Cl^-$, $Br^-$, $I^-$, & $HSO_4^=$ |
| II. 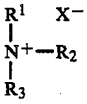 | Primary, Secondary or Tertiary Amines<br>$R_1$ is a group containing at least 8 carbon atoms. $R_2$ and $R_3$ can be $H^+$ or alkyl groups containing from 1 to 22 carbon atoms. |
| III. 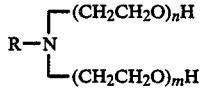 | Ethoxylated Primary Amines<br>n & m = 1 to 10 R consists of an alkyl group containing 8–22 carbon atoms. |
| IV. 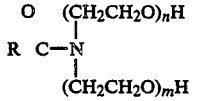 | Exthyoxylated Amides<br>R consists of a group containing from 7 to 21 carbon atoms. |
| V. 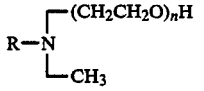 | Ethoxylated Fatty Secondary Amides<br>R is a group containing 8 to 20 carbon atoms. |
| VI. 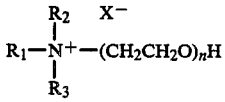 | Substituted Quaternized Ethoxylated Amines<br>R is a group containing 8 to 20 carbon atoms. |
| VII. $R\,\overset{O}{C}{-}CH_3$ | Ethoxylated Fatty Secondary Amine<br>R is a group containing 8 to 20 carbon atoms. |

The anionic surfactants can generally be described as acid salts and can be represented by the following formulas:

| | |
|---|---|
| I. $(R{-}COO^-)M^+$ | Fatty Acid Salts<br>R is an alkyl group containing 12 to 22 carbon atoms. $M^+$ = Na, K, $NH_4$ or substituted ammonium. |
| II. $(R{-}SO_3^-)M^+$ | Sulfonates<br>R is an alkyl group containing 12 to 22 carbon atoms. $M^+$ = Na, K, $NH_4$ or substituted ammonium. |
| III. $(R{-}OSO_3^-)M^+$ | Sulfates<br>R is an alkyl group containing 12 to 22 carbon atoms. $M^+$ = Na, K, $NH_4$ or substituted ammonium. |
| IV. 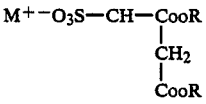 | Sulfosuccinates<br>$M^+$ = Na, K, $NH_4$ or substituted ammonium. R is a group conatining from 4 to 22 carbon atoms. |
| V. 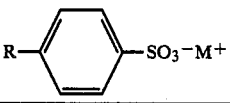 | $M^{30}$ = Na, K, $NH_4$ or substituted ammonium. R is an alkyl group containing 8 to 18 carbon atoms. |

Specific surfactants that have been found suitable include the following:

| Surfactant Type | Trade Name | Chemical Name |
|---|---|---|
| I. Non-Ionic | (a) Triton X-144 | Octyl phenoxy polyethoxyethanol |
| | (b) Triton N-101 | Nonyl phenoxy polyethoxyethanol |
| | (c) Triton X-705 | Octyl phenoxy polyethoxyethanol |
| | (d) Triton X-114 | Octyl phenoxy polyethoxyethanol |
| | (e) SynFac 334-10 | Aryl phenoxy polyethoxyethanol |
| | (f) SynFac 334-13 | Aryl phenoxy polyethoxyethanol |
| | (g) SynFac 334-20 | Aryl phenoxy polyethoxyethanol |
| | (h) Pluronic F-108 | Block copolymer of propylene oxide and ethylene oxide |
| II. Anionic | (a) Aerosal OT-75 | Sodium dioctyl sulfosuccinate |
| | (b) Aerosol TR-70 | Sodium Bis (Tridecyl) sulfosuccinate |
| | (c) Ammonium Tallate | Ammonium Tallate |
| | (d) Ammonium oleate | Ammonium oleate |
| | (e) Ammoniacal Solution of Joncryl 678 | Ammoniacal solution of Styrene/Acrylic oligomer |
| III. Cationic | (a) Ethomeen C-15 | Polyoxyethylene cocoamine |
| | (b) Ethomeen O-15 | Polyoxyethylene oleylamine |

Typical useful surfactant concentration levels have been found to be from about 12 to 48% by weight based on the crude. This concentration level of surfactant is a critical aspect of the invention and has been found to result in a shorter grinding of crude to a much smaller particle size without flocculation of the pigment in the aqueous solution. It is very important that flocculation not take place according to the present dispersion method of pigment production and the surfactant selection and concentration are therefore critical aspects of the present method.

The process according to the invention is preferably run at a temperature from about 5° to 80° C. and will work perfectly adequately at room temperature. In fact, however, all grinding operations result in generation of heat, so that cooling is necessary if the mix is to be kept at ambient temperature; the temperature may be allowed to rise somewhat, for example to 80° C., so as to save expense on cooling, without detrimental effect, but we prefer that the temperature of grinding should not in any case rise to above 90° C.

The blending of the crude (Step A) in the present method may be accomplished in any type reaction vessel or shot mill. The blend is agitated to produce a homogeneous composition. Preferably, the blend is then pumped through at least two pressurized shot mills in series capable of retaining grinding media made from glass, steel, ceramics, etc., in the size range of from 0.1 to 1.5 mm. diameter. The rate at which the blend is fed into the shot mills can be varied between 50 and 1000 lb/hour and most preferably in the range of 100 to 250 lb/hour. The blend is passed through at least two shot mills in series to achieve the tinctorial color value of pigment suitable for commercial use. However, it will be appreciated that the residence time in the shot mill will determine the particle size of the pigment but one, or more that two shot mills in series, can also be used in the grinding step. It has been found that the use of at least two shot mills provides the optimum conditions of time and power usage for the formation of pigment dispersion having the tinctorial color value desired in commercial use.

Various additives can be included in the mixture of crude pigment with surfactant and water before it is passed through the shot mills. For example the use of small amount of materials to adjust pH or sequester traces of metallic ions in the water is well known and commonly employed in the manufacture of aqueous pigment dispersions. Further, the use of small amount of additives known to improve flow, maintain homogeneity, retard caking and drying and provide for resistance to microbial attack is common.

The aqueous pigment dispersions prepared in accordance with the present invention may be used for coloring a variety of compositions such as, for example, paper, textiles, plastics, fibers and especially water-based inks and paints. The aqueous pigment dispersions may also be used in oil-based inks and paints by flushing the aqueous dispersion into the desired oil-based product or by direct addition when the associated water can be tolerated.

Typically, inks prepared in accordance with this invention contain a pigment which is dispersed in a surfactant or resin solution. The inks may contain other conventional ink ingredients. For instance, ethyl cellulose, wax compounds, rheology modifiers, antifoaming agents, preservatives, pigment wetting agents, reactive resins, etc., may be added for their known effects.

The invention will next be illustrated in terms of specific examples. In these examples, as well as in the other parts of the present application, all amounts and proportions are expressed as parts by weight unless otherwise indicated.

DESCRIPTION OF THE PREFERRED EMBODIMENTS

EXAMPLE I

The following materials were charged into a 150 gallon tank:

a. Water—356.5 lbs.
b. 28% Aqueous Ammonia—10 lbs.
c. SynFac 334-20—7.5 lbs.
d. SynFac 334-10—26.0 lbs.

These materials were stirred in the tub and the following was added while stirring.

e. Quinacridone Red Crude—100 lbs.

The mixture was stirred until a homogeneous blend was obtained. The blend was then continuously pumped through two shot mills (Drais Mills) in series at a rate of 150 lbs./hr. Each Drais Mill contained steel shot of 0.25 mm diameter. Grinding was completed in approximately three and one half hours. The resulting aqueous dispersion was then evaluated and found to contain superior color properties.

EXAMPLE II

The following quinacridone crudes are used in place of the Quinacridone Red Crude in Example I and the same procedure is followed:

a. Quinacridone Magenta Crude
b. Quinacridone Violet Crude
c. Quinacridone Scarlet Crude

EXAMPLE III

The following surfactants are used in place of the SynFac 334-20 and SynFac 334-10 in Example I, the replacement being made on the basis of equivalent total solids and the same procedure is followed.

a. SynFac 334-13
b. Triton X-144
c. Ammoniacal Solution of Joncryl 678
d. Aerosol OT-75

EXAMPLE IV

The following materials were charged into a 55 gallon container:

a. Water—17 gallons
b. Amerstat 252 microbiocide—0.8 lbs.
c. 28% Aqueous Ammonia—6.0 lbs.
d. SynFac 334-13—26.0 lbs.
e. SynFac 334-20—7.5 lbs.

These materials were stirred in the container and the following was added while stirring:

f. Hamp-ene $(NH_4)_2$ 130—2.0 lbs.
g. Hydrocarbon Solvent—10.-lbs.
h. Carbazole Violet Desalt Crude—100 lbs.

The mixture was stirred until a homogenous blend was obtained. The blend was then continuously pumped through three shot mills (Drais Mills) in series at a rate of 250 lbs./hr. Each Drais Mill contained shot of 0.25 mm diameter. A second pass through three shot mills in series was made and the resulting product evaluated as a textile ink. The color strength was found to be greatly improved over the initial blend but only about one half the strength of commercial products. The mixture was then passed through three shot mills in series two more times and the resulting product evaluated as a textile ink. The color strength was found to be further improved in strength to approximately equal commercial products.

EXAMPLE V

The following surfactants are used in place of the SynFac 334-13 and SynFac 334-20 in Example IV, the replacement being made on the basis of equivalent total solids and the same procedure is followed:

a. SynFac 334-10
b. Triton N-101
c. Triton N-101 plus Triton X705
d. Triton X-114
e. Pluronic F-108
f. Ammoniacal Solution of Joncryl 678
g. Aerosol OT-75
h. Ammonium oleate

EXAMPLE VI

The following materials were charged into a 250 gallon tub:

a. Water—91 gallons
b. Amerstat 252 Microbiocide—4 lbs.

c. 28% Aqueous Ammonia—5 gallons
d. SynFac 334-13—122 lbs.
e. SynFac 334-20—54.6 lbs.

These materials were stirred in the tub and the following was added while stirring:

f. Crude chlorinated copper phthalocyanine green—707.7 lbs.
g. Hamp-ene $(NH_4)_2$ 130—10.5 lbs.
h. Hydrocarbon Solvent—71 lbs.

The mixture was stirred until a homogeneous blend was obtained. The blend was then continuously pumped through two shot mills (Drais Mills) in series at a rate of 175 lbs./hr. Each Drais Mill contained steel shot of 0.25 mm diameter. Grinding was completed in approximately ten hours. The resulting aqueous dispersion was then evaluated and found to contain superior color properties. The pigment dispersion was then diluted with 269 lbs. of water and 60 lbs. of SynFac 334-13 to exactly match a commerical textile printing ink.

EXAMPLE VII

Crude brominated copper phthalocyanine green is used in place of crude chlorinated copper phthalocyanine given in Example VI and the same procedure is followed.

EXAMPLE VIII

The following surfactants are used in place of the SynFac 334-13 and SynFac 334-20 in Example VI, the replacement being made on the basis of equivalent total solids and the same procedure is followed.

a. SynFac 334-10
b. Triton X-114
c. Ammoniacal Solution of Joncryl 678
d. Aerosol OT-75
e. Ammonium oleate

We claim:

1. A method of converting pigment crude to an aqueous dispersed form, said method comprising A. premixing a crude with from about 12 to about 48% by weight of surfactant, based on pigment, and an amount of water sufficient to reduce the crude concentration to 10 to 50% by weight, based on the total mixture, and B. continuously pumping the blend of A. through at least two shot mills in series containing between 50 and 90% by volume of grinding media that has a size in the range of from about 0.1 to 1.5 mm diameter and then grinding until the particle size has been reduced to where the pigment dispersion has suitable tinctorial strength for use in inks and coatings.

2. The method of claim 1 in which the grinding in the shot mill is carried out at a temperature of 5° to 80° C.

3. A water-based printing ink comprising dispersed pigment in an aqueous solution of water-soluble resin wherein the pigment is dispersed by the method claim 1.

* * * * *